United States Patent
Julian et al.

(10) Patent No.: US 9,959,499 B2
(45) Date of Patent: May 1, 2018

(54) METHODS AND APPARATUS FOR IMPLEMENTATION OF GROUP TAGS FOR NEURAL MODELS

(71) Applicant: QUALCOMM Incorporated, San Diego, CA (US)

(72) Inventors: David Jonathan Julian, San Diego, CA (US); Jeffrey Alexander Levin, San Diego, CA (US); Jeffrey Baginsky Gehlhaar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 14/268,152

(22) Filed: May 2, 2014

(65) Prior Publication Data

US 2015/0088796 A1    Mar. 26, 2015

Related U.S. Application Data

(60) Provisional application No. 61/882,465, filed on Sep. 25, 2013.

(51) Int. Cl.
| | | |
|---|---|---|
| G06F 15/18 | (2006.01) | |
| G06N 3/08 | (2006.01) | |
| G06N 3/04 | (2006.01) | |

(52) U.S. Cl.
CPC ........... *G06N 3/049* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 5,276,769 | A | * | 1/1994 | Ueda ........................ G06N 3/08 706/25 |
| 6,446,055 | B1 | * | 9/2002 | Grand ..................... G06F 9/465 706/10 |
| 8,504,499 | B2 | | 8/2013 | Lewi et al. |
| 8,630,966 | B2 | | 1/2014 | Gage et al. |
| 9,129,220 | B2 | | 9/2015 | Aparin et al. |
| 2011/0055131 | A1 | * | 3/2011 | Chen ........................ G06N 3/08 706/25 |
| 2013/0073494 | A1 | | 3/2013 | Modha |
| 2013/0073496 | A1 | | 3/2013 | Szatmary et al. |
| 2013/0297541 | A1 | | 11/2013 | Piekniewski et al. |

(Continued)

FOREIGN PATENT DOCUMENTS

WO    WO-2012054109    4/2012

OTHER PUBLICATIONS

Ijspeert et al. "From Swimming to Walking with a Salamander Robot Driven by a Spinal Cord Model", Science, 2007, pp. 1416-1419.*

(Continued)

*Primary Examiner* — Li-Wu Chang
(74) *Attorney, Agent, or Firm* — Patterson & Sheridan, L.L.P.

(57) ABSTRACT

Certain aspects of the present disclosure support assigning neurons and/or synapses to group tags where group tags have an associated set of parameters. By using group tags, neurons or synapses in a population can be assigned a group tag. Then, by changing a parameter associated with the group tag, all synapses or neurons in the group may have that parameter changed.

19 Claims, 11 Drawing Sheets

(56) References Cited

U.S. PATENT DOCUMENTS

| | | | | |
|---|---|---|---|---|
| 2013/0325776 | A1* | 12/2013 | Ponulak | G06N 3/08 706/25 |
| 2013/0325777 | A1* | 12/2013 | Petre | G06N 3/049 706/26 |
| 2014/0032458 | A1* | 1/2014 | Sinyavskiy | G06N 3/049 706/16 |

OTHER PUBLICATIONS iicwww "Synchronized Oscillations and Locking", 2013, oages: 10 https://web.archive.org/web/20130318095828/http://icwww.epfl.ch/~gerstner/SPNM/node60.html.*

Davison AP., et al., "PyNN: a common interface for neuronal network simulators", Frontiers in Neuroinformatics, vol. 2, 11, Oct. 21, 2008 (Oct. 21, 2008), pp. 1-5, XP055179215, DOI: 10.3389/neuro.11.011.2008, "Usage Examples" "High-Level Object-Oriented Interface".

Drewes R., et al., "Brainlab: a Python toolkit to aid in the design, simulation, and analysis of spiking neural networks with the NeoCortical Simulator", Frontiers in Neuroinformatics, vol. 3, 16, Oct. 21, 2008 (Oct. 21, 2008), pp. 1-5, XP055179223, DOI: 10.3389/neuro.11.016.2009, "Usage Example: RAIN Network".

Galluppi F., et al., "A hierachical configuration system for a massively parallel neural hardware platform", Proceedings of the 9TH Conference on Computing Frontiers (CF'12), May 15, 2012 (May 15, 2012). pp. 183-192, XP055179253, DOI:10.1145/2212908.2212934.

Gleeson et al., "NeuroML: A Language for Describing Data Driven Models of Neurons and Networks with a High Degree of Biological Detail", PLoS Computational Biology, Jun. 2010, pp. 1-19 vol. 6 Issue 6.

Goodman D., et al., "Brian: a simulator for spiking neural networks in Python", Frontiers in Neuroinformatics, vol. 2, 5, Sep. 30, 2008 (Sep. 30, 2008), pp. 1-5, XP055179218, DOI: 10.3389/neuro.11.005.2008 "Worked Example".

International Search Report and Written Opinion—PCT/US2014/051469—ISA/EPO—dated Apr. 7, 2015.

Muresan RC., et al., "The Neocortex neural simulator: a modern design", Proceedings of the 8th International Conference on Intelligent Engineering Systems (INES'04), Sep. 19, 2004 (Sep. 19, 2004), pp. 99-104, XP055179240, Retrieved from the Internet: URL:http://www.ines-conf.org/ines-conf/18_INES2004.pdf—[retrieved on Jun. 4, 2010].

Plesser HE., et al.,"Specification and generation of structured neuronal network models with the Nest topology module", BMC Neuroscience, vol. 10, No. 1, P56, Jul. 13, 2009 (Jul. 13, 2009), XP021056866, DOI: 10.1186/1471-2202-10-S1-P56.

* cited by examiner

METHODS AND APPARATUS FOR IMPLEMENTATION OF GROUP TAGS FOR NEURAL MODELS

CLAIM OF PRIORITY UNDER 35 U.S.C. § 119

This application claims benefit of U.S. Provisional Patent Application Ser. No. 61/882,465, filed Sep. 25, 2013 and entitled "Group Tags for Neural Models," incorporated by reference in its entirety.

BACKGROUND

Field

Certain aspects of the present disclosure generally relate to artificial nervous systems and, more particularly, to methods and apparatus for implementing group tags for neurons and synapses.

Background

An artificial neural network, which may comprise an interconnected group of artificial neurons (i.e., neural processing units), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure provide a method for operating an artificial nervous system. The method generally includes assigning at least one of a first population of synapses or a first population of artificial neurons of the artificial nervous system to a first group tag, wherein the first group tag is associated with a first set of parameters and at least one of a first synapse type or a first neuron type, assigning at least one of a second population of synapses or a second population of artificial neurons of the artificial nervous system to a second group tag, wherein the second group tag is associated with a second set of parameters and at least one of a second synapse type or a second neuron type, and changing one or more parameters in at least one of the first set of parameters or the second set of parameters causing changing the one or more parameters for at least one of: one or more synapses in at least one of the first population or the second population, or one or more artificial neurons in at least one of the first population or the second population.

Certain aspects of the present disclosure provide an apparatus for operating an artificial nervous system. The apparatus generally includes a processing system and a memory coupled to the processing system. The processing system is typically configured to assign at least one of a first population of synapses or a first population of artificial neurons of the artificial nervous system to a first group tag, wherein the first group tag is associated with a first set of parameters and at least one of a first synapse type or a first neuron type, assign at least one of a second population of synapses or a second population of artificial neurons of the artificial nervous system to a second group tag, wherein the second group tag is associated with a second set of parameters and at least one of a second synapse type or a second neuron type, and change one or more parameters in at least one of the first set of parameters or the second set of parameters causing changing the one or more parameters for at least one of: one or more synapses in at least one of the first population or the second population, or one or more artificial neurons in at least one of the first population or the second population.

Certain aspects of the present disclosure provide an apparatus for operating an artificial nervous system. The apparatus generally includes means for assigning at least one of a first population of synapses or a first population of artificial neurons of the artificial nervous system to a first group tag, wherein the first group tag is associated with a first set of parameters and at least one of a first synapse type or a first neuron type, means for assigning at least one of a second population of synapses or a second population of artificial neurons of the artificial nervous system to a second group tag, wherein the second group tag is associated with a second set of parameters and at least one of a second synapse type or a second neuron type, and means for changing one or more parameters in at least one of the first set of parameters or the second set of parameters causing changing the one or more parameters for at least one of: one means for or more synapses in at least one of the first population or the second population, or one or more artificial neurons in at least one of the first population or the second population.

Certain aspects of the present disclosure provide a computer program product for operating an artificial nervous system. The computer program product generally includes a computer-readable medium having instructions executable to assign at least one of a first population of synapses or a first population of artificial neurons of the artificial nervous system to a first group tag, wherein the first group tag is associated with a first set of parameters and at least one of a first synapse type or a first neuron type, assign at least one of a second population of synapses or a second population of artificial neurons of the artificial nervous system to a second group tag, wherein the second group tag is associated with a second set of parameters and at least one of a second synapse type or a second neuron type, and change one or more parameters in at least one of the first set of parameters or the second set of parameters causing changing the one or more parameters for at least one of: one or more synapses in at least one of the first population or the second population, or one or more artificial neurons in at least one of the first population or the second population.

Certain aspects of the present disclosure provide a method for operating an artificial nervous system. The method generally includes assigning a group of artificial neurons and synapses of the artificial nervous system to a group tag with an associated set of parameters, and sending a single message changing values of the parameters in the set causing simultaneous switch of the parameters for all artificial neurons and synapses in the group.

Certain aspects of the present disclosure provide an apparatus for operating an artificial nervous system. The apparatus generally includes a processing system and a memory coupled to the processing system. The processing system is typically configured to assign a group of artificial neurons and synapses of the artificial nervous system to a group tag with an associated set of parameters, and send a single message changing values of the parameters in the set causing simultaneous switch of the parameters for all artificial neurons and synapses in the group.

Certain aspects of the present disclosure provide an apparatus for operating an artificial nervous system. The apparatus generally includes means for assigning a group of artificial neurons and synapses of the artificial nervous system to a group tag with an associated set of parameters, and means for sending a single message changing values of the parameters in the set causing simultaneous switch of the parameters for all artificial neurons and synapses in the group.

Certain aspects of the present disclosure provide a computer program product for operating an artificial nervous system. The computer program product generally includes a computer-readable medium having instructions executable to assign a group of artificial neurons and synapses of the artificial nervous system to a group tag with an associated set of parameters, and send a single message changing values of the parameters in the set causing simultaneous switch of the parameters for all artificial neurons and synapses in the group.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Figure 1:
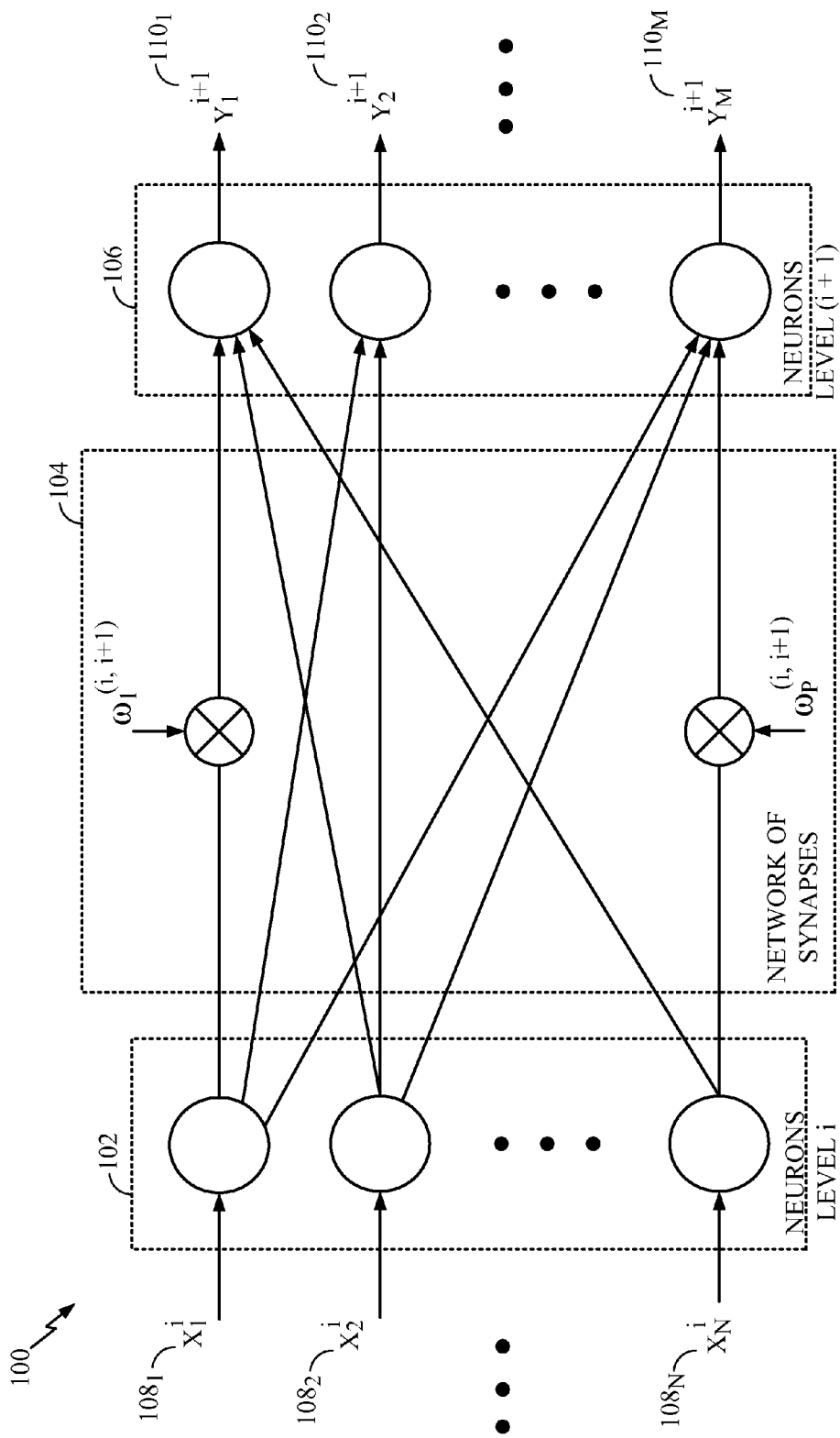
FIG. 1 illustrates an example network of neurons, in accordance with certain aspects of the present disclosure.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof An Example Neural System FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
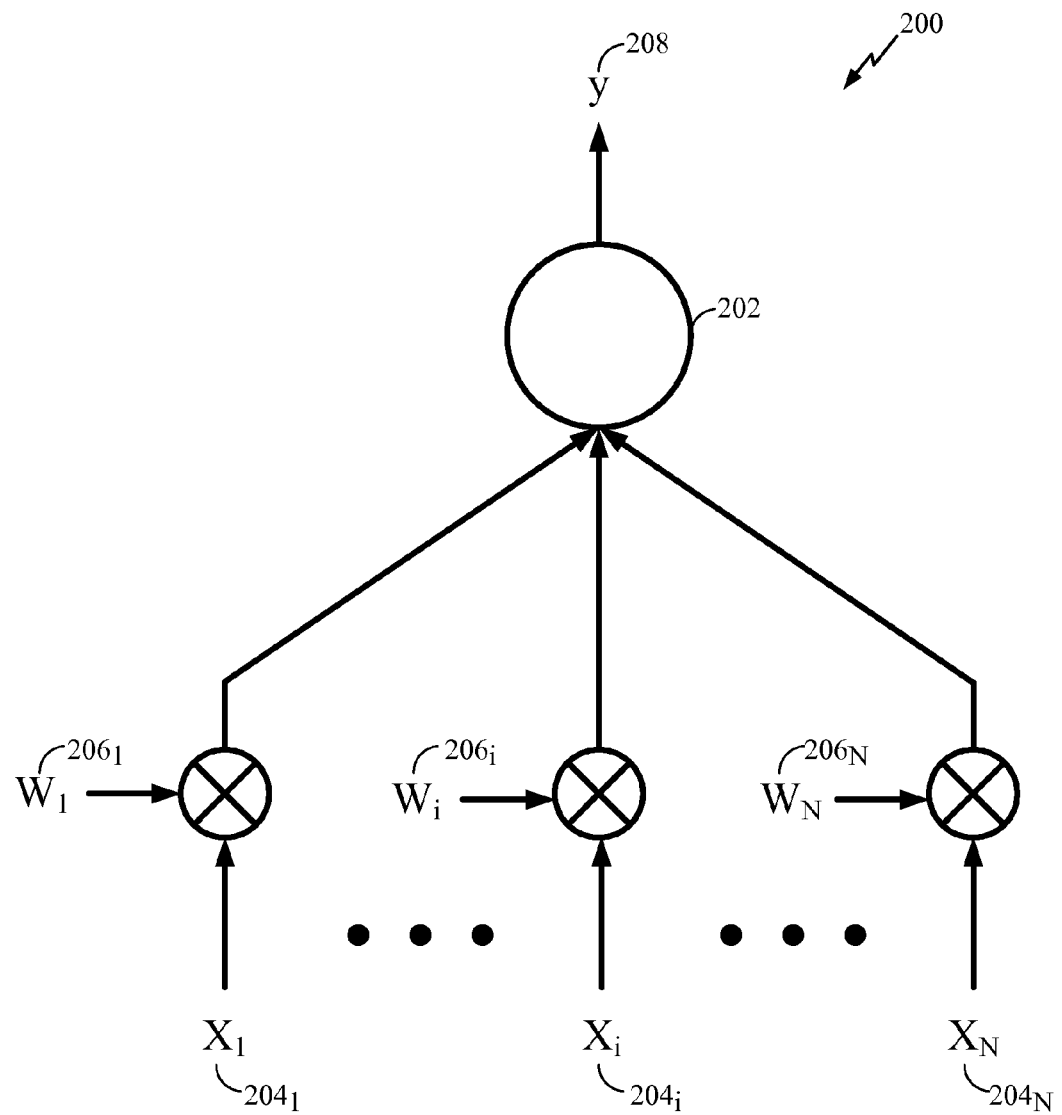
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, t > 0 \\ a_- e^{t/k_-}, t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
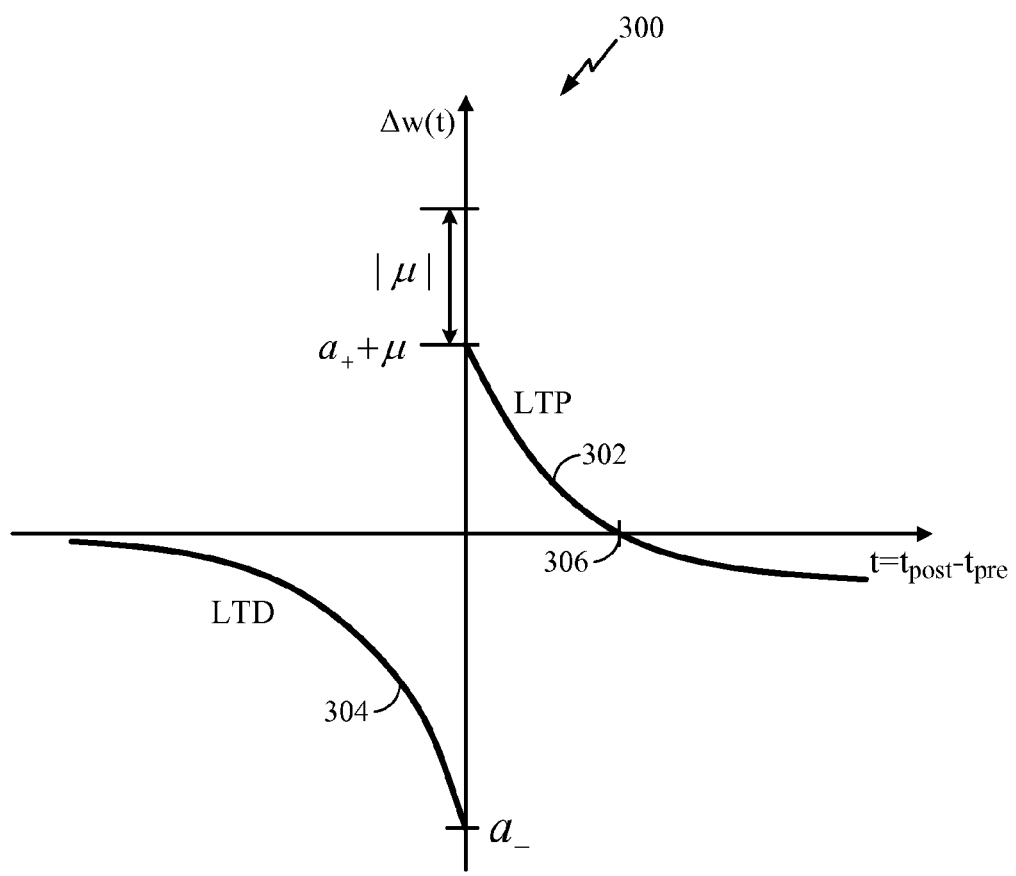
FIG. 3 illustrates an example spike-timing dependent plasticity (STDP) curve, in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
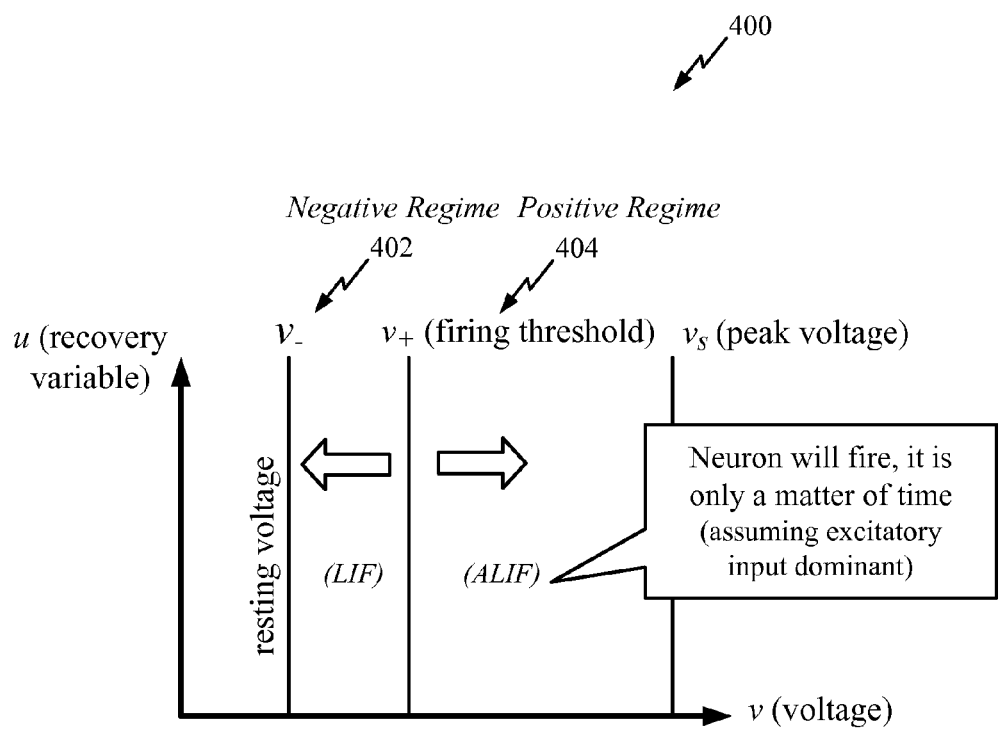
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest (v_) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \tag{5}$$

$$-\tau_u \frac{du}{dt} = u + r \tag{6}$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \tag{7}$$

$$r = \delta(v+\varepsilon) \tag{8}$$

where $\delta$, $\varepsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\delta$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \tag{9}$$

$$u = u + \Delta u \tag{10}$$

where $\hat{v}_-$ and $\Delta u$ are parameters. The reset voltage $\hat{v}_-$ is typically set to $v_-$.

By a principle of momentary coupling, a closed-form solution is possible not only for state (and with a single exponential term), but also for the time required to reach a particular state. The closed-form state solutions are $$v(t + \Delta t) = (v(t) + q_\rho)e^{\frac{\Delta t}{\tau_\rho}} - q_\rho \tag{11}$$

$$u(t + \Delta t) = (u(t) + r)e^{-\frac{\Delta t}{\tau_u}} - r \tag{12}$$

Therefore, the model state may be updated only upon events, such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \tag{13}$$

If a spike is defined as occurring at the time the voltage state v reaches $v_s$, then the closed-form solution for the amount of time, or relative delay, until a spike occurs as measured from the time that the voltage is at a given state v is $$\Delta t_S = \begin{cases} \tau_+ \log \frac{v_S + q_+}{v + q_+} & \text{if } v > \hat{v}_+ \\ \infty & \text{otherwise} \end{cases} \tag{14}$$

where $\hat{v}_+$ is typically set to parameter $v_+$, although other variations may be possible.

The above definitions of the model dynamics depend on whether the model is in the positive or negative regime. As mentioned, the coupling and the regime $\rho$ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update"

(at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Example Problem being Solved

Certain aspects of the present disclosure provide solutions for two problems: reduction of memory requirement for a set of artificial neurons and/or synapses, and turning on/off flags associated with large populations of artificial neurons and/or synapses simultaneously or in close temporal proximity.

In spiking neuron networks, there are a number of parameters that define each artificial neuron (neuron circuit) and synapse. Populations of neurons and synapses often share the same parameters or differ in only a few parameters. For populations that share the same parameters, the concept of synapse types and neuron types may be used. Hence, each synapse or neuron instance may only need a few bits to specify its synapse type or neuron type, and the synapse type or neuron type table may comprise a list of the synapse or neuron parameters. This approach may already save a substantial amount of memory for synapses or artificial neurons that share the exact same parameters.

However, neuron or synapse populations may often differ in only a few parameters that currently need a completely new type definition where it would be preferable to save the memory. Often times, two or more neuron or synapse populations are associated with neuron or synapse type parameters that are common and consume a large amount of the parameter memory. Examples of these parameters are STDP tables and differential equation linearized coefficient tables, with a subset of parameters differing between the populations that consume a little amount of the parameter memory, such as enable/disable flags for different features. Hence, there is a need in the art for a method to take advantage of this potential memory savings to reduce the hardware memory requirements in implementation of neural networks.

In addition, in a neural network, there are often groups or populations of synapses or neurons that have features that need to be enabled or disabled simultaneously or at least in very close temporal proximity. For example, a visual network may have three layers of neurons. The first layer (i.e., layer 1) may comprise L4 excitatory and L4 inhibitory neurons with synapses from retinal ganglion cells (RGCs). The second layer (i.e., layer 2) may comprise L23 excitatory and L23 inhibitory neurons with synapses from the L4 layer neurons, and the third layer (i.e., layer 3) may comprise synapses from the L23 inhibitory to the L23 excitatory neurons. In an aspect, it may be desirable to first train layer 1, then layer 2, and finally layer 3. This may be achieved, for example, by setting plasticity enable/disable parameters in the synapses and/or neurons first for layer 1, then for layer 2, and finally for layer 3.

More broadly, there may be a parallel auditory network with a similar layered structure that can be trained simultaneously, but also with the aforementioned layered approach. It may be desirable to provide a method to control parameters, such as plasticity enable/disable, for populations of neurons and/or synapses such as those in layer 1, simultaneously or in close temporal proximity. It should be noted that the close temporal proximity means that it may be desirable for the enable/disable parameters to be within a few clock cycles or model ticks of each other.

Group Tags for Artificial Neurons and Synapses

Certain aspects of the present disclosure support assigning artificial neurons and/or synapses of an artificial nervous system to group tags where group tags have an associated set of parameters. By using group tags, artificial neurons and/or synapses in a population can be assigned a group tag. Then, by changing a parameter associated with the group tag, all synapses and/or artificial neurons in the group may have that parameter changed.

In one aspect of the present disclosure, the parameters in a synapse type that include the STDP table and plasticity parameters as well as flags for enabling/disabling plasticity, spiking, and dopamine would be grouped into two separate structures. A first structure may comprise synapse type with the STDP table, resource model, and other plasticity parameters, wherein a second group tag structure may comprise flags to enable/disable plasticity, flags for post-synaptic potential (PSP) transfer, and flags for dopamine. Then, synapses would be assigned both a group tag and a synapse type. In this aspect, synapses with different synapse types could be assigned the same group tag, such as all of the layer 1 synapses in the aforementioned example. This would enable controlling all flags for these populations simultaneously and with minimal signaling overhead even over different synapse types.

In another aspect of the present disclosure, the same aforementioned concept can be utilized for artificial neurons of an artificial nervous system.

In yet another aspect of the present disclosure, the group tag can be combined to have a single tag for a group of both artificial neurons and synapses with a combination of parameters that may apply to only neurons, only synapses, and both. For example, the artificial neurons may be associated with homeostasis enable/disable flags and the synapses PSP transfer enable/disable flags, and both may share a plasticity enable/disable flag. By sending a single message changing these values for this group, it would simultaneously switch these parameters for all the synapses and artificial neurons in the group.

In yet another aspect of the present disclosure, group tags can be implemented as a super set of a synapse type. In this aspect, a synapse would only specify itself as a group tag. The group tag would specify a set of parameters, such as plasticity enable/disable, resource enable/disable, and PSP gain, dopamine enable/disable, and a synapse type to use. The synapse type would then specify the STDP table, the resource model, and other associated parameters. In this aspect, the synapse type parameters may comprise the parameters that use more memory and that are common to several populations of synapses, such as STDP look up tables. The group tag may comprise parameters taking up much less memory, such as feature enable/disable flags, which vary over populations that otherwise share core STDP tables. For example, a neuron model may comprise three populations of synapses that share the same STDP tables, but need to have plasticity turned on at different time instants, or may differ only in whether or not dopamine or resource models are utilized. Rather than using the memory to duplicate the entire table, using group tags in this context allows for more efficient memory usage.

Two key examples of this aspect arise when normalizing synaptic weights to fit well in hardware. In the first example, there are two or more populations of synapses using the exact same learning rules, but in two or more places in the network where they have different fan-outs and hence different maximum weights or PSP gains. In this case, all the parameters are the same except this one parameter related to fan-out, and the use of group tags enables a more efficient memory structure. In the second example, two or more populations of neurons utilize the same model parameters except for the input scaling parameter that changes based on the fan-in. Again, the use of group tags may enable a more efficient memory structure.

According to certain aspects of the present disclosure, the group tag parameters could be stored in several ways. In one aspect, a set of parameters may be associated with the group tag and a separate disjoint set of parameters may be associated with the synapse and/or neuron type.

In another aspect, some or all of the group tag parameters may be associated with a synapse type and/or a neuron type where the group tag has the ability to override the synapse/neuron type parameters if they are present and active. For example, the group tag may be able to override up to three synapse type parameters, wherein a field may specify which parameter to override, using a default value to indicate none, and another field specifies the new value to use. This can provide more flexibility using the same amount of memory or even less memory.

Additional Features

According to certain aspects of the present disclosure, group tags may be assigned dynamically. Furthermore, a synapse or artificial neuron may belong to more than one group. One method of belonging to more than one group is that the neurons/synapses track the changes to any group they belong to and maintain the last updated values based on their set of group membership.

One implementation of this approach can be to create a larger set of groups that comprises all the used expansions of single and multiple initial group membership. Then, hardware or software could track the single group value changes and apply them to both the single groups as well as the existing multiple group sets that the single group is part of. In this way, a change does not need to be propagated to all synapses/neurons as it happens, but rather the synapses/neurons can go to the shared database making updates efficient in terms of number of writes and occurring quickly in terms of time to the first neuron/synapse update using the new value.

In an aspect of the present disclosure, group parameters may be changed from within the neural network. For example, the group A plasticity could be enabled based on a certain neuron spiking and disabled based on a different neuron spiking. Those neurons may or may not belong to group A. Furthermore, the group A plasticity could be enabled based on a set of neurons spiking, based on a set of neurons having an activity rate above/below a threshold, or based on a function of the synaptic weights reaching a metric, such as a sum of weights being above a defined value or percent of synapses having weights above a specific value.

In accordance with certain aspects of the present disclosure, group tags may be activity dependent. For example, in one aspect, all cells (e.g., place cells, superior colliculus cells, V1 cells, etc) firing within a window of time may be assigned to group tag A. In another aspect, all the synapses with weights below a threshold or above a threshold may be assigned to group tag B. In yet another aspect, all cells (e.g., place cells, superior colliculus cells, V1 cells, etc) firing at a rate above/below a threshold may obtain a certain group tag. In yet another aspect, all cells (e.g., place cells, superior colliculus cells, V1 cells, etc) firing inside/outside a window of time may be assigned to a certain group tag. In yet another aspect, all cells (e.g., place cells, superior colliculus cells, V1 cells, etc) with neuron parameters such as membrane voltages above/below a threshold may get a specific group tag.

Dynamic tagging of synapses with weights below a threshold may be utilized to turn on/off plasticity updates based on processor load availability. Hence, these dynamic tags may be used to target the least important synapses for spike dropping. Dynamic tagging may also be used for flagging underutilized synapses and/or neurons for reallocation or structural plasticity. For example, a structural plasticity enable bit could be set for a dynamic group of synapses with low weights or a group of neurons with low spiking rates. Furthermore, dynamic tagging may also be used for debug and measurement purposes and statistics, e.g., for getting metrics such as the percentage of populations with given tags.

Figure 5:
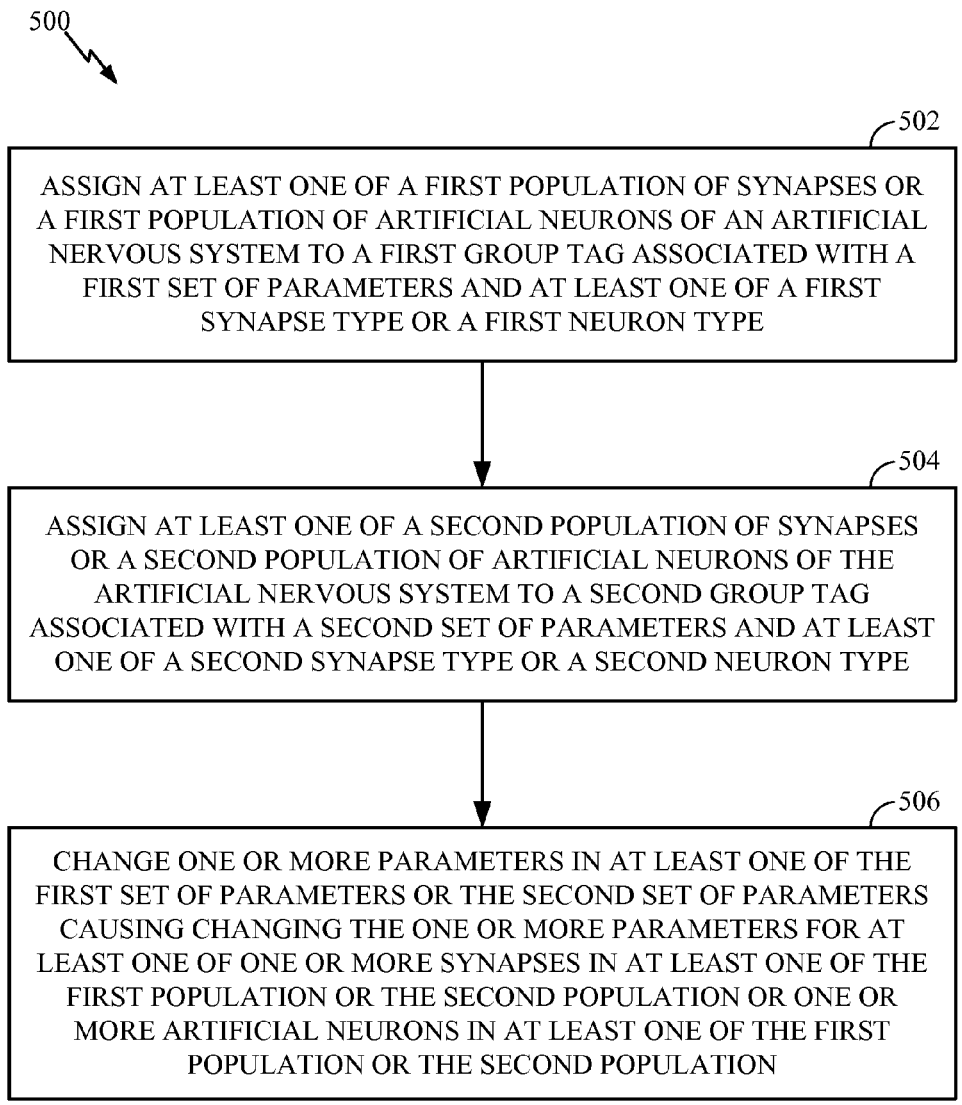
FIG. 5 is a flow diagram of example operations for operating an artificial nervous system, in accordance with certain aspects of the present disclosure.
Figure 5A:
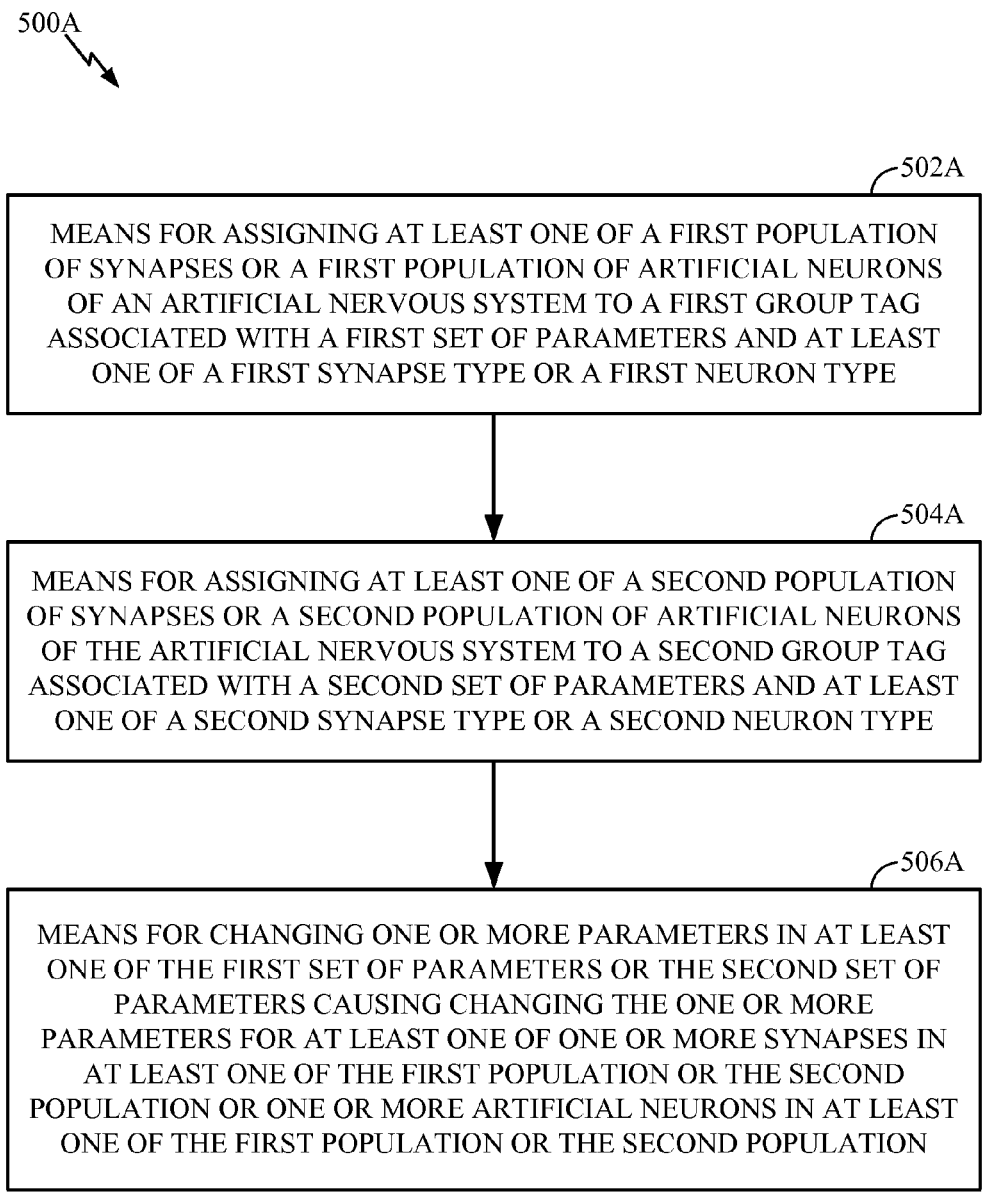
FIG. 5A illustrates example means capable of performing the operations shown in FIG. 5.

FIG. 5 is a flow diagram of example operations 500 for operating an artificial nervous system in accordance with certain aspects of the present disclosure. The operations 500 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, etc.

The operations 500 may begin, at 502, by assigning at least one of a first population of synapses or a first population of artificial neurons of the artificial nervous system to a first group tag, wherein the first group tag may be associated with a first set of parameters and at least one of a first synapse type or a first neuron type. At 504, at least one of a second population of synapses or a second population of artificial neurons of the artificial nervous system may be assigned to a second group tag, wherein the second group tag may be associated with a second set of parameters and at least one of a second synapse type or a second neuron type. At 506, one or more parameters in at least one of the first set of parameters or the second set of parameters may be changed causing changing the one or more parameters for at least one of: one or more synapses in at least one of the first population or the second population, or one or more artificial neurons in at least one of the first population or the second population.

In an aspect of the present disclosure, at least one of: two or more populations of synapses, or two or more populations of artificial neurons of the artificial nervous system may be assigned to two or more group tags, wherein the two or more group tags may be associated with two or more sets of parameters and at least one of two or more synapse types or two or more neuron types. Changing one or more parameters in at least one of the two or more sets of parameters may cause changing the one or more parameters for at least one of: one or more synapses in at least one of the two or more populations, or one or more artificial neurons in at least one of the two or more populations.

In an aspect of the present disclosure, both the first and second group tags may be utilized for tagging at least one of: one or more of the artificial neurons or one or more of the synapses with both the first and second group tags. Changing parameters associated with the first and second synapse types may cause changing these parameters for all synapses in the first and second populations. In addition, changing other parameters associated with the first and second neuron types may cause changing these other parameters for all artificial neurons in the first and second populations.

In an aspect of the present disclosure, parameters in the first and second sets may be controlled simultaneously. In an aspect of the present disclosure, the first synapse type may be same as the second synapse type, and the first neuron type may be same as the second neuron type. Furthermore, parameters in the first and second sets may be changed at different time instants, and a value of a parameter in the first set may differ from a value of that parameter in the second set.

In an aspect of the present disclosure, the first and second populations of synapses may be subsets of a set of synapses of at least one of same layer or same type, and the first and second populations of artificial neurons may be subsets of a set of artificial neurons of at least one of same layer or same type. Parameters in the first and second sets may be disjoint from parameters associated with the first and second synapse types.

For certain aspects of the present disclosure, at least one parameter in the first and second sets may be common with at least one parameter associated with the first and second synapse types. Furthermore, overriding of the at least one parameter associated with the first and second synapse types may be based on the at least one parameter in the first and second sets.

Figure 6:
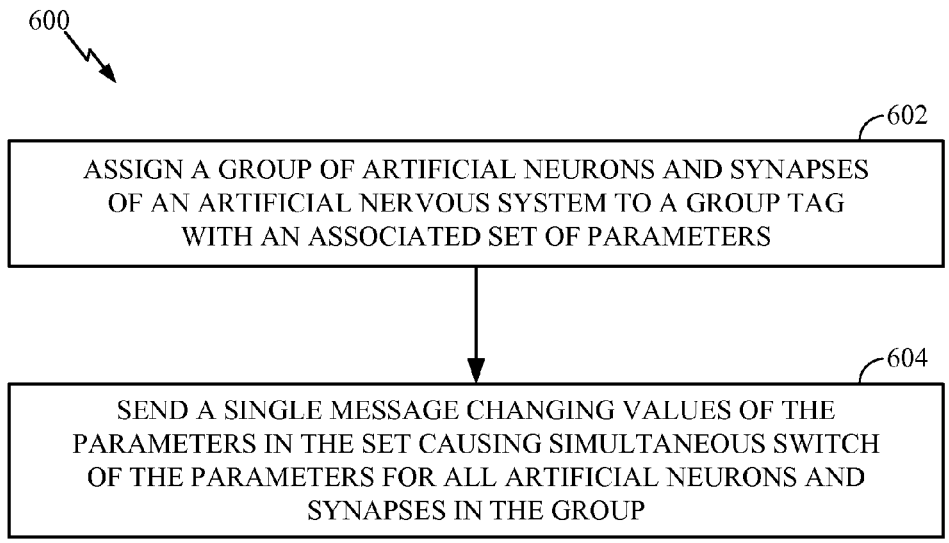
FIG. 6 is another flow diagram of example operations for operating an artificial nervous system, in accordance with certain aspects of the present disclosure.
Figure 6A:
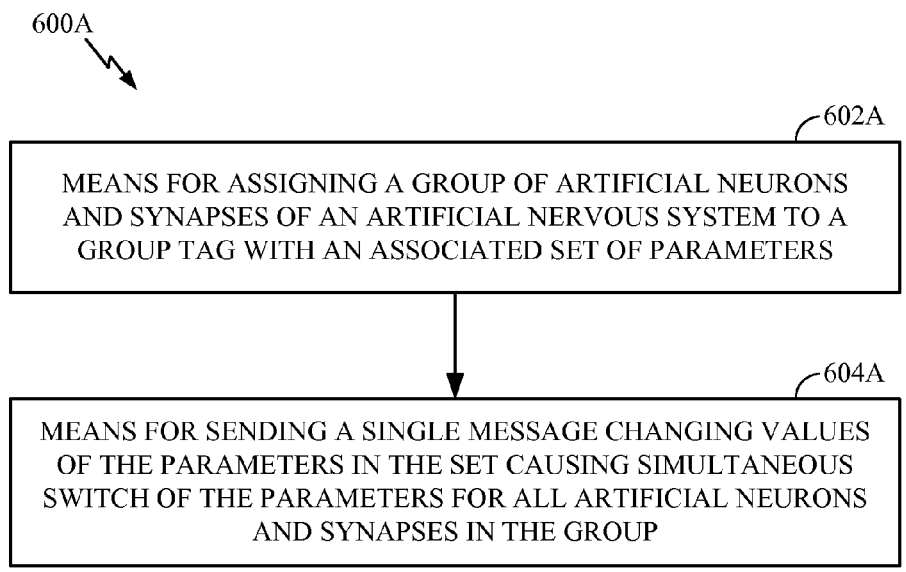
FIG. 6A illustrates example means capable of performing the operations shown in FIG. 6.

FIG. 6 is a flow diagram of example operations 600 for operating an artificial nervous system in accordance with certain aspects of the present disclosure. The operations 600 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, etc.

The operations 600 may begin, at 602, by assigning a group of artificial neurons and synapses of the artificial nervous system to a group tag with an associated set of parameters. At 604, a single message may be send changing values of the parameters in the set causing simultaneous switch of the parameters for all artificial neurons and synapses in the group. According to certain aspects of the present disclosure, the parameters in the set may comprise parameters applying only to artificial neurons in the group, parameters applying only to synapses in the group, and parameters applying to both artificial neurons and synapses in the group.

Figure 7:
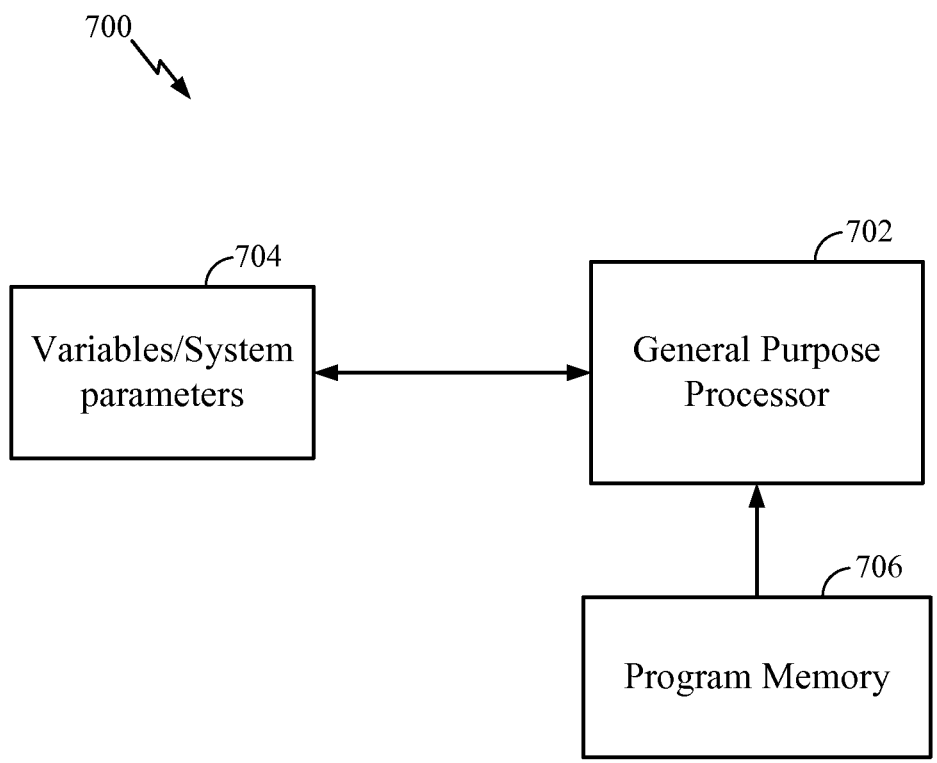
FIG. 7 illustrates an example implementation for operating an artificial nervous system using a general-purpose processor, in accordance with certain aspects of the present disclosure.

FIG. 7 illustrates an example block diagram 700 of the aforementioned method for operating an artificial nervous system using a general-purpose processor 702 in accordance with certain aspects of the present disclosure. Variables (neural signals), synaptic weights, and/or system parameters associated with a computational network (neural network) may be stored in a memory block 704, while instructions related executed at the general-purpose processor 702 may be loaded from a program memory 706. In an aspect of the present disclosure, the instructions loaded into the general-purpose processor 702 may comprise code for assigning at least one of a first population of synapses or a first population of artificial neurons of the artificial nervous system to a first group tag, wherein the first group tag is associated with a first set of parameters and at least one of a first synapse type or a first neuron type, for assigning at least one of a second population of synapses or a second population of artificial neurons of the artificial nervous system to a second group tag, wherein the second group tag is associated with a second set of parameters and at least one of a second synapse type or a second neuron type, and for changing one or more parameters in at least one of the first set of parameters or the second set of parameters causing changing the one or more parameters for at least one of: one or more synapses in at least one of the first population or the second population, or one or more artificial neurons in at least one of the first population or the second population. In another aspect of the present disclosure, the instructions loaded into the general-purpose processor 702 may comprise code for assigning a group of artificial neurons and synapses to a group tag with an associated set of parameters, and for sending a single message changing values of the parameters in the set causing simultaneous switch of the parameters for all artificial neurons and synapses in the group.

Figure 8:
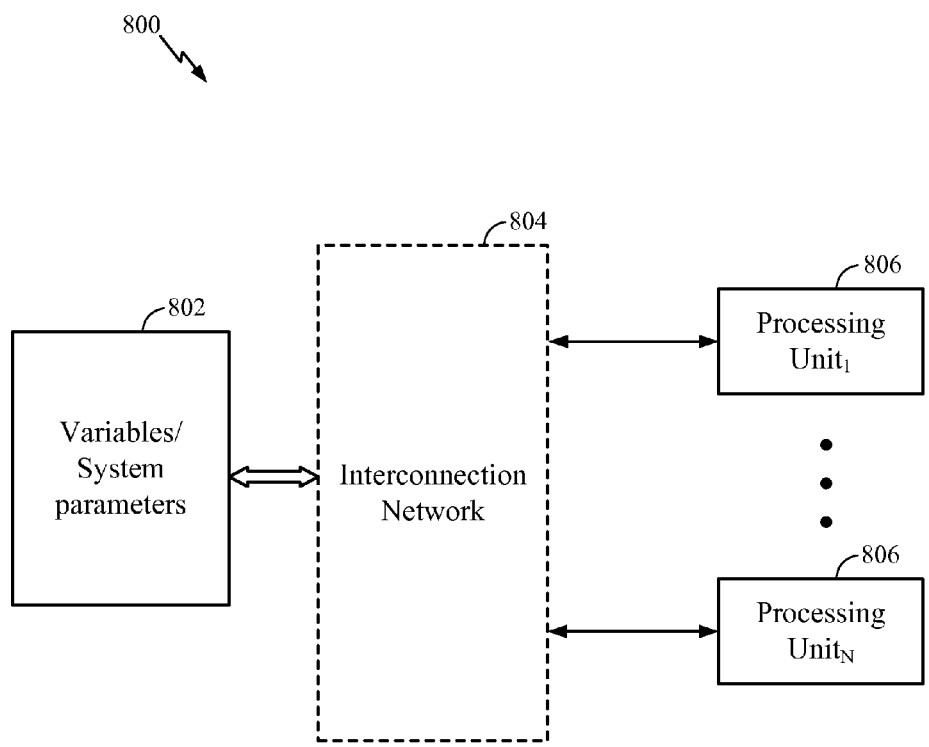
FIG. 8 illustrates an example implementation for operating an artificial nervous system where a memory may be interfaced with individual distributed processing units, in accordance with certain aspects of the present disclosure.

FIG. 8 illustrates an example block diagram 800 of the aforementioned method for operating an artificial nervous system where a memory 802 can be interfaced via an interconnection network 804 with individual (distributed) processing units (neural processors) 806 of a computational network (neural network) in accordance with certain aspects of the present disclosure. Variables (neural signals), synaptic weights, and/or system parameters associated with the computational network (neural network) may be stored in the memory 802, and may be loaded from the memory 802 via connection(s) of the interconnection network 804 into each processing unit (neural processor) 806. In an aspect of the present disclosure, the processing unit 806 may be configured to assign at least one of a first population of synapses or a first population of artificial neurons of the artificial nervous system to a first group tag, wherein the first group tag is associated with a first set of parameters and at least one of a first synapse type or a first neuron type, to assign at least one of a second population of synapses or a second population of artificial neurons of the artificial nervous system to a second group tag, wherein the second group tag is associated with a second set of parameters and at least one of a second synapse type or a second neuron type, and to change one or more parameters in at least one of the first set of parameters or the second set of parameters causing changing the one or more parameters for at least one of: one or more synapses in at least one of the first population or the second population, or one or more artificial neurons in at least one of the first population or the second population. In another aspect of the present disclosure, the processing unit 806 may be configured to assign a group of artificial neurons and synapses to a group tag with an associated set of parameters, and to send a single message changing values of the parameters in the set causing simultaneous switch of the parameters for all artificial neurons and synapses in the group.

Figure 9:
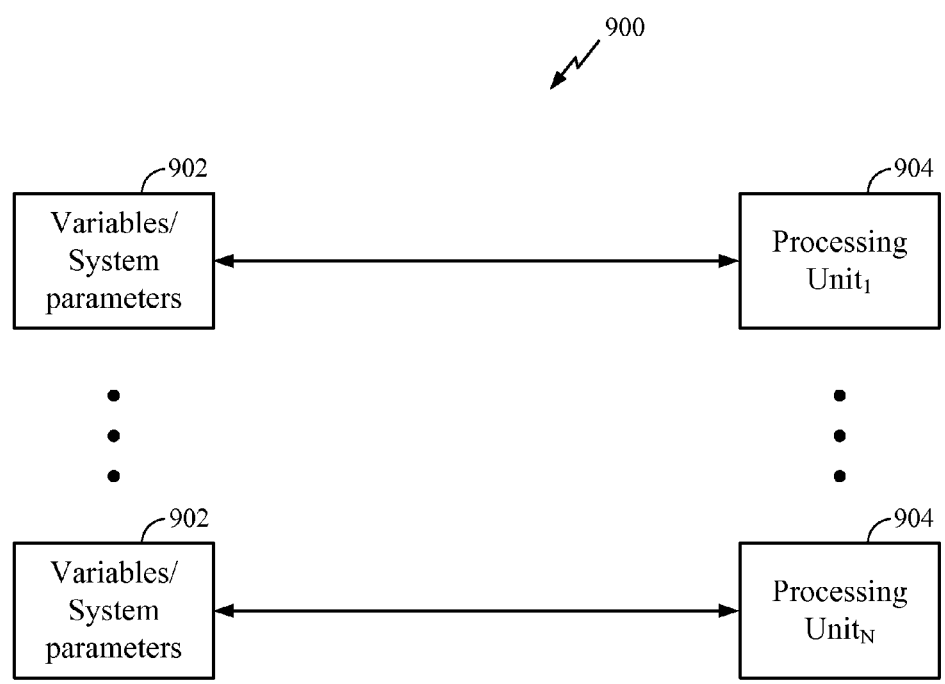
FIG. 9 illustrates an example implementation for operating an artificial nervous system based on distributed memories and distributed processing units, in accordance with certain aspects of the present disclosure.

FIG. 9 illustrates an example block diagram 900 of the aforementioned method for operating an artificial nervous system based on distributed weight memories 902 and distributed processing units (neural processors) 904 in accordance with certain aspects of the present disclosure. As illustrated in FIG. 9, one memory bank 902 may be directly interfaced with one processing unit 904 of a computational network (neural network), wherein that memory bank 902 may store variables (neural signals), synaptic weights, and/or system parameters associated with that processing unit (neural processor) 904. In an aspect of the present disclosure, the processing unit(s) 904 may be configured to assign at least one of a first population of synapses or a first population of artificial neurons of the artificial nervous system to a first group tag, wherein the first group tag is associated with a first set of parameters and at least one of a first synapse type or a first neuron type, to assign at least one of a second population of synapses or a second population of artificial neurons of the artificial nervous system to a second group tag, wherein the second group tag is associated with a second set of parameters and at least one of a second synapse type or a second neuron type, and to change one or more parameters in at least one of the first set of parameters or the second set of parameters causing changing the one or more parameters for at least one of: one or more synapses in at least one of the first population or the second population, or one or more artificial neurons in at least one of the first population or the second population. In another aspect of the present disclosure, the processing unit 904 may be configured to assign a group of artificial neurons and synapses to a group tag with an associated set of parameters, and to send a single message changing values of the parameters in the set causing simultaneous switch of the parameters for all artificial neurons and synapses in the group.

Figure 10:
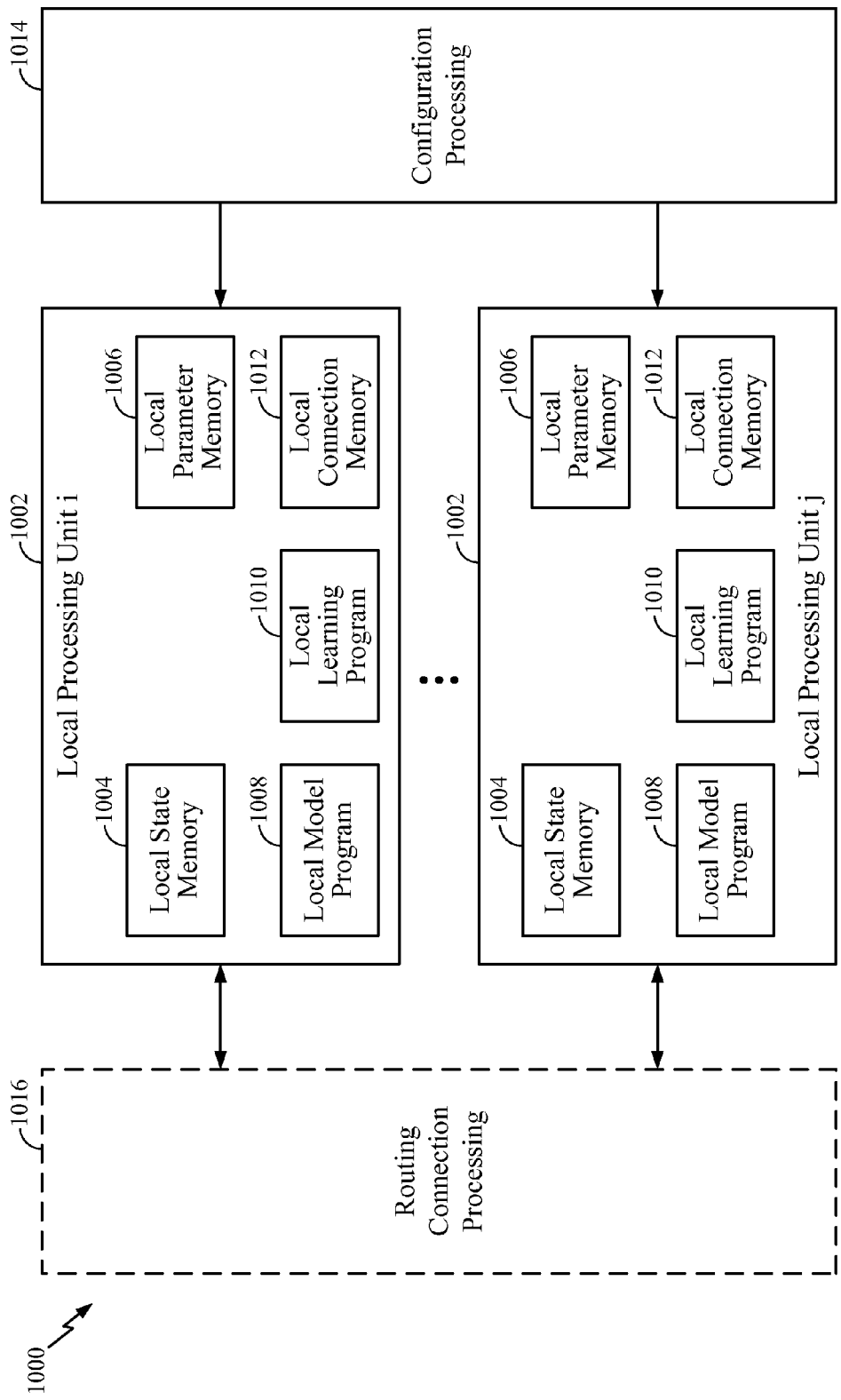
FIG. 10 illustrates an example implementation of a neural network, in accordance with certain aspects of the present disclosure.

FIG. 10 illustrates an example implementation of a neural network 1000 in accordance with certain aspects of the present disclosure. As illustrated in FIG. 10, the neural network 1000 may comprise a plurality of local processing units 1002 that may perform various operations of methods described above. Each processing unit 1002 may comprise a local state memory 1004 and a local parameter memory 1006 that store parameters of the neural network. In addition, the processing unit 1002 may comprise a memory 1008 with a local (neuron) model program, a memory 1010 with a local learning program, and a local connection memory 1012. Furthermore, as illustrated in FIG. 10, each local processing unit 1002 may be interfaced with a unit 1014 for configuration processing that may provide configuration for local memories of the local processing unit, and with routing connection processing elements 1016 that provide routing between the local processing units 1002.

According to certain aspects of the present disclosure, each local processing unit 1002 may be configured to determine parameters of the neural network based upon desired one or more functional features of the neural network, and develop the one or more functional features towards the desired functional features as the determined parameters are further adapted, tuned and updated.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 7-10. Generally, where there are operations illustrated in figures, those operations may have corresponding counterpart means-plus-function components with similar numbering. For example, operations 500-600 illustrated in FIGS. 5-6 correspond to means 500A-600A illustrated in FIGS. 5A-6A.

For example, means for displaying may include a display (e.g., a monitor, flat screen, touch screen, and the like), a printer, or any other suitable means for outputting data for visual depiction (e.g., a table, chart, or graph). Means for processing, means for receiving, means for tracking, means for adjusting, means for updating, or means for determining may comprise a processing system, which may include one or more processors or processing units. Means for sensing may include a sensor. Means for storing may include a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for operating neuron circuits of an artificial nervous system, comprising:
   assigning at least one of a first population of synapses in the neuron circuits or a first population of artificial neurons in the neuron circuits of the artificial nervous system to a first group tag, wherein the synapses or the artificial neurons of the first population have a first set of parameters, and wherein the first group tag is associated with the first set of parameters and at least one of a first synapse type or a first neuron type;
   assigning at least one of a second population of synapses in the neuron circuits or a second population of artificial neurons in the neuron circuits of the artificial nervous system to a second group tag, wherein the synapses or the artificial neurons of the second population have a second set of parameters, and wherein the second group tag is associated with the second set of parameters and at least one of a second synapse type or a second neuron type;
   changing values of one or more parameters in at least one of the first set of parameters or the second set of parameters causing simultaneous changing of the one or more parameters for at least one of: two or more synapses in at least one of the first population based on the association with the first group tag or the second population based on the association with the second group tag, or two or more artificial neurons in at least one of the first population based on the association with the first group tag or the second population based on the association with the second group tag, wherein the first and second sets of parameters comprise at least one of a flag to enable plasticity, a flag to disable plasticity, a flag for post-synaptic potential (PSP) transfer, a flag for dopamine, a homeostasis enable flag, a homeostasis disable flag, a plasticity enable flag or a plasticity disable flag, and wherein the changing values comprises controlling simultaneously the flag to enable plasticity, the flag to disable plasticity, the flag for post-synaptic potential (PSP) transfer, and the flag for dopamine.

2. The method of claim 1, further comprising tagging at least one of: one or more of the artificial neurons or one or more of the synapses with both the first and second group tags.

3. The method of claim 1, further comprising:
   changing parameters associated with the first and second synapse types causing changing these parameters for all synapses in the first and second populations; and
   changing other parameters associated with the first and second neuron types causing changing these other parameters for all artificial neurons in the first and second populations.

4. The method of claim 1, wherein parameters associated with the first and second synapse types comprise at least one of a spike-timing-dependent plasticity (STDP) table, a resource model, or plasticity parameters.

5. The method of claim 1, further comprising:
   controlling simultaneously parameters in the first and second sets.

6. The method of claim 1, wherein:
   the first synapse type is same as the second synapse type, and
   the first neuron type is same as the second neuron type, and the method further comprising
   changing parameters in the first and second sets at different time instants, and
   a value of a parameter in the first set differs from a value of that parameter in the second set.

7. The method of claim 1, wherein:
   the first and second populations of synapses are subsets of a set of synapses of at least one of same layer or same type, and
   the first and second populations of artificial neurons are subsets of a set of artificial neurons of at least one of same layer or same type.

8. The method of claim 1, wherein parameters in the first and second sets are disjoint from parameters associated with the first and second synapse types.

9. The method of claim 1, wherein at least one parameter in the first and second sets is common with at least one parameter associated with the first and second synapse types, and the method further comprising
overriding, based on the at least one parameter in the first and second sets, the at least one parameter associated with the first and second synapse types.

10. The method of 1, wherein at least one of the first group tag or the second group tag is assigned dynamically.

11. The method of claim 10, wherein dynamically assigning the at least one of first group tag or second group tag is associated with synapses of at least one of the first population of synapses or the second population of synapses with weights below a threshold.

12. The method of claim 10, wherein dynamically assigning the at least one of first group tag or second group tag further comprises:
flagging underutilized synapses of at least one of the first or second populations of synapses and underutilized artificial neurons of at least one of the first or second populations of artificial neurons for at least one of reallocation or structural plasticity.

13. The method of claim 1, wherein changing the one or more parameters comprises enabling and disabling plasticity, and the method further comprising:
enabling plasticity based on a certain artificial neuron of the first population of artificial neurons or of the second population of artificial neurons spiking; and
disabling plasticity based on a different certain artificial neuron of the first population of artificial neurons or of the second population of artificial neurons spiking.

14. The method of claim 1, wherein changing the one or more parameters comprises enabling and disabling plasticity, and the method further comprising:
enabling plasticity based on a set of artificial neurons of at least one of the first population of artificial neurons or the second population of artificial neurons spiking.

15. The method of claim 1, wherein changing the one or more parameters comprises enabling and disabling plasticity, and the method further comprising:
enabling plasticity based on a set of artificial neurons of at least one of the first population of artificial neurons or the second population of artificial neurons having a defined activity rate.

16. The method of claim 1, wherein changing the one or more parameters comprises enabling and disabling plasticity, and the method further comprising:
enabling plasticity based on a function of synaptic weights associated with at least one of the first population of synapses or the second population of synapses reaching a metric.

17. An apparatus for operating neuron circuits of an artificial nervous system, comprising:
one or more processors configured to:
assign at least one of a first population of synapses in the neuron circuits or a first population of artificial neurons in the neuron circuits of the artificial nervous system to a first group tag, wherein the synapses or the artificial neurons of the first population having a first set of parameters, and wherein the first group tag is associated with the first set of parameters and at least one of a first synapse type or a first neuron type;
assign at least one of a second population of synapses in the neuron circuits or a second population of artificial neurons in the neuron circuits of the artificial nervous system of the artificial nervous system to a second group tag, wherein the synapses or the artificial neurons of the second population having a second set of parameters, and wherein the second group tag is associated with the second set of parameters and at least one of a second synapse type or a second neuron type; and
change values of one or more parameters in at least one of the first set of parameters or the second set of parameters causing simultaneous changing of the one or more parameters for at least one of: two or more synapses in at least one of the first population based on the association with the first group tag or the second population based on the association with the second group tag, or two or more artificial neurons in at least one of the first population based on the association with the first group tag or the second population based on the association with the second group tag, wherein the first and second sets of parameters comprise at least one of a flag to enable plasticity, a flag to disable plasticity, a flag for post-synaptic potential (PSP) transfer, a flag for dopamine, a homeostasis enable flag, a homeostasis disable flag, a plasticity enable flag or a plasticity disable flag, and wherein the changing values comprises controlling simultaneously the flag to enable plasticity, the flag to disable plasticity, the flag for post-synaptic potential (PSP) transfer, and the flag for dopamine; and
a memory coupled to the processing system.

18. An apparatus for operating neuron circuits of an artificial nervous system, comprising:
means for assigning at least one of a first population of synapses in the neuron circuits or a first population of artificial neurons in the neuron circuits of the artificial nervous system to a first group tag, wherein the synapses or the artificial neurons of the first population having a first set of parameters, and wherein the first group tag is associated with a first set of parameters and at least one of a first synapse type or a first neuron type;
means for assigning at least one of a second population of synapses in the neuron circuits or a second population of artificial neurons in the neuron circuits of the artificial nervous system to a second group tag, wherein the synapses or the artificial neurons of the second population having a second set of parameters, and wherein the second group tag is associated with the second set of parameters and at least one of a second synapse type or a second neuron type; and
means for changing values of one or more parameters in at least one of the first set of parameters or the second set of parameters causing simultaneous changing of the one or more parameters for at least one of: two or more synapses in at least one of the first population based on the association with the first group tag or the second population based on the association with the second group tag, or two or more artificial neurons in at least one of the first population based on the association with the first group tag or the second population based on the association with the second group tag, wherein the first and second sets of parameters comprise at least one of a flag to enable plasticity, a flag to disable plasticity, a flag for post-synaptic potential (PSP) transfer, a flag for dopamine, a homeostasis enable flag, a homeostasis disable flag, a plasticity enable flag or a plasticity disable flag, and wherein the changing values comprises controlling simultaneously the flag to enable plasticity, the flag to disable plasticity, the flag for post-synaptic potential (PSP) transfer, and the flag for dopamine.

19. A non-transitory computer-readable medium for operating neuron circuits of an artificial nervous system, the computer-readable medium having instructions executable to:

assign at least one of a first population of synapses in the neuron circuits or a first population of artificial neurons in the neuron circuits of the artificial nervous system to a first group tag, wherein the synapses or the artificial neurons of the first population having a first set of parameters, and wherein the first group tag is associated with the first set of parameters and at least one of a first synapse type or a first neuron type;

assign at least one of a second population of synapses in the neuron circuits or a second population of artificial neurons in the neuron circuits of the artificial nervous system to a second group tag, wherein the synapses or the artificial neurons of the second population having a second set of parameters, and wherein the second group tag is associated with the second set of parameters and at least one of a second synapse type or a second neuron type; and change values of one or more parameters in at least one of the first set of parameters or the second set of parameters causing simultaneous changing of the one or more parameters for at least one of: two or more synapses in at least one of the first population based on the association with the first group tag or the second population based on the association with the second group tag, or two or more artificial neurons in at least one of the first population based on the association with the first group tag or the second population based on the association with the second group tag, wherein the first and second sets of parameters comprise at least one of a flag to enable plasticity, a flag to disable plasticity, a flag for post-synaptic potential (PSP) transfer, a flag for dopamine, a homeostasis enable flag, a homeostasis disable flag, a plasticity enable flag or a plasticity disable flag, and wherein the changing values comprises controlling simultaneously the flag to enable plasticity, the flag to disable plasticity, the flag for post-synaptic potential (PSP) transfer, and the flag for dopamine.

\* \* \* \* \*